United States Patent
Dewhurst

(10) Patent No.: US 10,325,359 B2
(45) Date of Patent: Jun. 18, 2019

(54) PIXEL CONSISTENCY

(71) Applicant: Apical Ltd, Cambridge (GB)

(72) Inventor: Andrew Dewhurst, Loughborough (GB)

(73) Assignee: Apical Limited, Cambridge (GB)

( * ) Notice: Subject to any disclaimer, the term of this patent is extended or adjusted under 35 U.S.C. 154(b) by 21 days.

(21) Appl. No.: 15/373,278

(22) Filed: Dec. 8, 2016

(65) Prior Publication Data

US 2017/0169550 A1 Jun. 15, 2017

(30) Foreign Application Priority Data

Dec. 9, 2015 (GB) .................................. 1521653.4

(51) Int. Cl.
*G06T 5/00* (2006.01)
*G06K 9/00* (2006.01)
*G06T 5/50* (2006.01)
*H04N 5/235* (2006.01)
*H04N 5/367* (2011.01)
*G06K 9/03* (2006.01)

(52) U.S. Cl.
CPC .......... *G06T 5/007* (2013.01); *G06K 9/00711* (2013.01); *G06K 9/00805* (2013.01); *G06K 9/036* (2013.01); *G06T 5/50* (2013.01); *H04N 5/2355* (2013.01); *H04N 5/2357* (2013.01); *H04N 5/367* (2013.01); *H04N 5/3675* (2013.01); *G06T 2207/10004* (2013.01); *G06T 2207/10016* (2013.01); *G06T 2207/20208* (2013.01); *G06T 2207/30261* (2013.01)

(58) Field of Classification Search
CPC ......... G06T 5/002; G06T 5/007; G06T 5/009; G06T 5/50; G06T 7/97; G06T 2207/20172; G06T 2207/20182; G06T 2207/20208; G06K 9/036; H04N 5/2355; H04N 5/2357; H04N 5/367; H04N 5/3675
See application file for complete search history.

(56) References Cited

U.S. PATENT DOCUMENTS

| | | | |
|---|---|---|---|
| 2008/0123938 A1* | 5/2008 | Kim ...................... | H04N 13/239 382/154 |
| 2017/0372453 A1* | 12/2017 | Foster ..................... | G06T 5/002 |

* cited by examiner

*Primary Examiner* — Andrew W Johns
(74) *Attorney, Agent, or Firm* — EIP US LLP

(57) ABSTRACT

According to an aspect of the present disclosure, there is provided a method of image processing. The method comprises receiving image data. Image processing is applied to the image data, whereby to produce a processed image. The method then comprises producing consistency data associated with the image processing, wherein the consistency data is indicative of a consistency of at least one region of the processed image with the received image data. Both the processed image and the consistency data are used as inputs to a decision process of a computer vision system.

17 Claims, 8 Drawing Sheets

PIXEL CONSISTENCY

CROSS-REFERENCE TO RELATED APPLICATIONS

This application claims the benefit of Great Britain application GB 1521653.4, filed Dec. 9, 2015, the contents of which is incorporated by reference in its entirety herein.

TECHNICAL FIELD

The present application relates to methods, apparatus and computer programs for producing and processing data associated with image processing.

BACKGROUND

It is frequently desirable to conduct image processing prior to use of image data as an input to a computer vision system, which uses an object detection algorithm or algorithms to identify target objects. Image processing may be performed to improve the image data and thereby to improve the reliability of such a computer vision system. However, such image processing may occasionally have unexpected, or unpredictable, effects in the decision processes of the computer vision system.

SUMMARY

According to a first aspect, there is provided a method of image processing. The method comprises receiving image data, applying image processing to the image data, whereby to produce a processed image, producing consistency data associated with the image processing, wherein the consistency data is indicative of a consistency of at least one region of the processed image with the received image data, and using both the processed image and the consistency data as inputs to a decision process of a computer vision system.

The method may comprise receiving the image data from an image sensor, the image data being captured by the image sensor. In one example, the image data comprises a video frame. The image processing may comprise correction of at least one defective pixel in the image data. The consistency data may then identify at least one corrected pixel in the processed image corresponding to the at least one defective pixel in the image data.

In some examples, the processed image is a high dynamic range image. The image processing thus comprises producing the high dynamic range image from a plurality of images at varying exposure settings. In this example, the consistency data identifies at least one region in the processed image corresponding to at least one region in which there is an inconsistency between the plurality of images.

Alternatively or additionally, the image processing may comprise identifying and correcting for a flickering light source in the image data. The consistency data may then identify at least one corrected region in the processed image corresponding to the flickering light source in the image data. In some examples, the method comprises navigating an autonomous vehicle based on the decision process of the computer vision system. A region of the at least one region may be a single pixel of the processed image. Alternatively or additionally, a region of the at least one region may be a group of pixels of the processed image, the group of pixels having predetermined dimensions. In some examples, the predetermined dimensions depend on a position of the group of pixels within the processed image. The consistency data may be stored as a layer of the processed image.

According to a further aspect of the present disclosure, there is provided a non-transitory computer-readable storage medium comprising a set of computer-readable instructions stored thereon which, when executed by at least one processor, cause the at least one processor to perform a method as described above.

According to a further aspect, there is provided a computer vision apparatus comprising at least one processor, the at least one processor being configured to receive a processed image and consistency data associated with image processing applied to image data whereby to produce the processed image, the consistency data indicating a consistency of at least one region of the processed image with the received image data, and based on the processed image and the consistency data, perform a computer vision decision process. The computer vision apparatus may further comprise an image sensor configured to capture the image data. In some examples, the processor of computer vision apparatus is configured to apply image processing to the image data, whereby to produce the processed image, and generate the consistency data. In some examples, the computer vision apparatus is associated with an autonomous vehicle, and the decision process is an obstacle avoidance process of the autonomous vehicle. In such an example, the decision process may comprise decreasing a weight of input data derived from the processed image and increasing a weight of input data derived from a source other than the processed image.

Further features and advantages will become apparent from the following description of preferred embodiments, given by way of example only, which is made with reference to the accompanying drawings.

DETAILED DESCRIPTION

Figure 1:
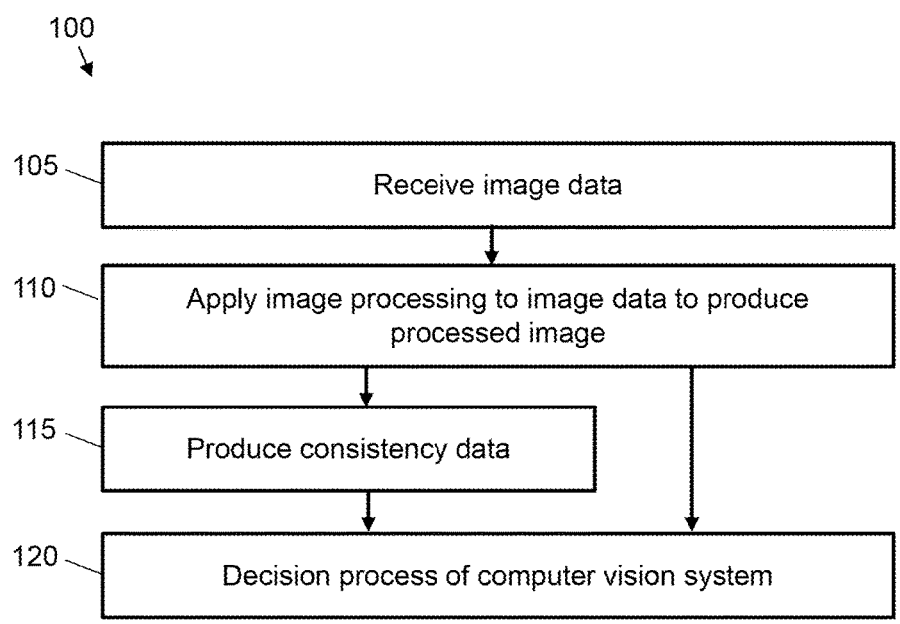
FIG. 1 shows a flow diagram of a method according to an example.

FIG. 1A shows a flow diagram of a method 100 of image processing. The method comprises a receiving step 105 in which image data is received. The image data may for example comprise raw image data received from an image sensor. The method then comprises a step 110 of applying image processing to the image data, whereby to produce a processed image. For example, as set out in more detail below the image processing may comprise image signal processing steps for converting raw image data to a format suitable for further processing, such as luma-chroma pixel data.

The method 100 then comprises a step 115 of producing consistency data associated with the image processing. The consistency data is indicative of a consistency of at least one region of the processed image with the received image data.

Finally, the method 100 comprises a step 120 of using both the processed image and the consistency data as inputs to a decision process of a computer vision system computer vision system, which uses an object detection algorithm or algorithms to identify target objects. In this manner, the method 100 allows computer vision decisions to be based on the consistency of a processed image with raw image captured by a sensor. This allows more reliable and well-informed computer vision decisions, as set out in more detailed examples below.

The image data may for example be received from an image sensor, the image data having been captured by the image sensor, for example as raw image data. The image data may relate to a still image or may comprise one or more video frames. The image sensor may comprise a charge-coupled device or complementary metal-oxide-semiconductor image sensor. In other examples, the image sensor may comprise a motion detector, an ultrasonic sensor, an infra-red sensor, or a radar receiver such as a phased array radar receiver.

The sensor itself may perform image processing steps in relation to the raw image data and/or image processing may be performed by a separate image processor or processors.

The image processing may comprise correction of at least one defective pixel in the image data. This may comprise a known method for dynamic detection of pixels which are uncharacteristic of their surrounding pixels. Defective pixels may alternatively or additionally be identified by a static technique wherein defective pixels are identified based on a pre-populated table of known defective pixels. A "best approximation" pixel may then be calculated as a substitute for the defective pixel. The consistency data may then identify at least one corrected pixel in the processed image corresponding to the at least one defective pixel in the image data. The computer vision decision may thus take into account the presence or lack thereof of corrected pixels in the processed image. For example, the presence of an approximated value may have an effect on an output of an object detection filter.

Alternatively or additionally, the image processing may comprise identifying and correcting for a flickering light source in the image data, for example where the image data relates to frames of a video. For example, it may be determined that a given region in the image data oscillates in a pattern corresponding to that expected from a regularly flickering light source. A correction, for example a correction gain, may then be applied to that region. The consistency data may then identify at least one corrected region in the processed image corresponding to the flickering light source in the image data. The consistency data may additionally comprise information relating to the flicker correction process, for example a percentage of frames in which the region appeared brighter and/or a percentage of frames in which the region appeared darker. In some examples, the flicker detection is performed prior to decoding of the image data. The flicker detection may for example be performed by a processor associated with the image sensor. In this manner, the decision process of the computer vision system may take into account whether a change in a region of the video frames is caused by a flickering light source as opposed to, for example, a moving light source or a plurality of light sources.

Alternatively or additionally, in examples in which the processed image is a high dynamic range image, the image processing may comprise producing the high dynamic range image by multi-exposure stitching, i.e. from a plurality of images at varying exposure settings. Various methods are known for construction of such a high dynamic range image. Construction of a high dynamic range image may be complicated by motion of an object in the plurality of an images and/or motion of an image sensor capturing the plurality of images. For example, an object may move between subsequent images of the plurality. The construction may also be complicated by other effects, such as noise in the plurality of images. These effects may cause inconsistencies between the plurality of images. The consistency data may then identify at least one region in the processed image corresponding to at least one region in which there is such an inconsistency between the plurality of images. As described in more detail below, these regions may comprise single pixels and/or larger regions. As such, the computer vision decision may take into account the detected motion between subsequent images.

As a further example, the image processing may alternatively or additionally comprise a noise reduction process. Such noise reduction processes typically combine analysis of pixels surrounding a given pixel, for example by way of a two-dimensional filter kernel, with data describing for example a noise profile and/or exposure settings associated with an image sensor that captured the image data. Noise reduction processes may mask image data by blurring the processed image. The consistency data may then indicate the application of noise reduction and/or a strength of noise reduction applied to a given region of the processed image. Alternatively or additionally, the consistency data may indicate an estimated signal-to-noise ratio for a given region of the processed image.

In some examples, the image processing alternatively or additionally comprises dynamic range compression of a high dynamic range image. For example, dynamic range compression may be performed to reduce the bit-depth of the processed image, for example to reduce the file size. This may for example comprise techniques such as a piecewise linear or knee-point companding curve. This may be described as local tone mapping. The consistency data may then comprise an indication of the strength of dynamic range compression, for example a local tone mapping gain, in a given region of the processed image. In some examples, this consistency data may then be used in conjunction with corresponding pixel values of the processed image to approximate the uncompressed high dynamic range pixel values of a given region.

Figure 2:
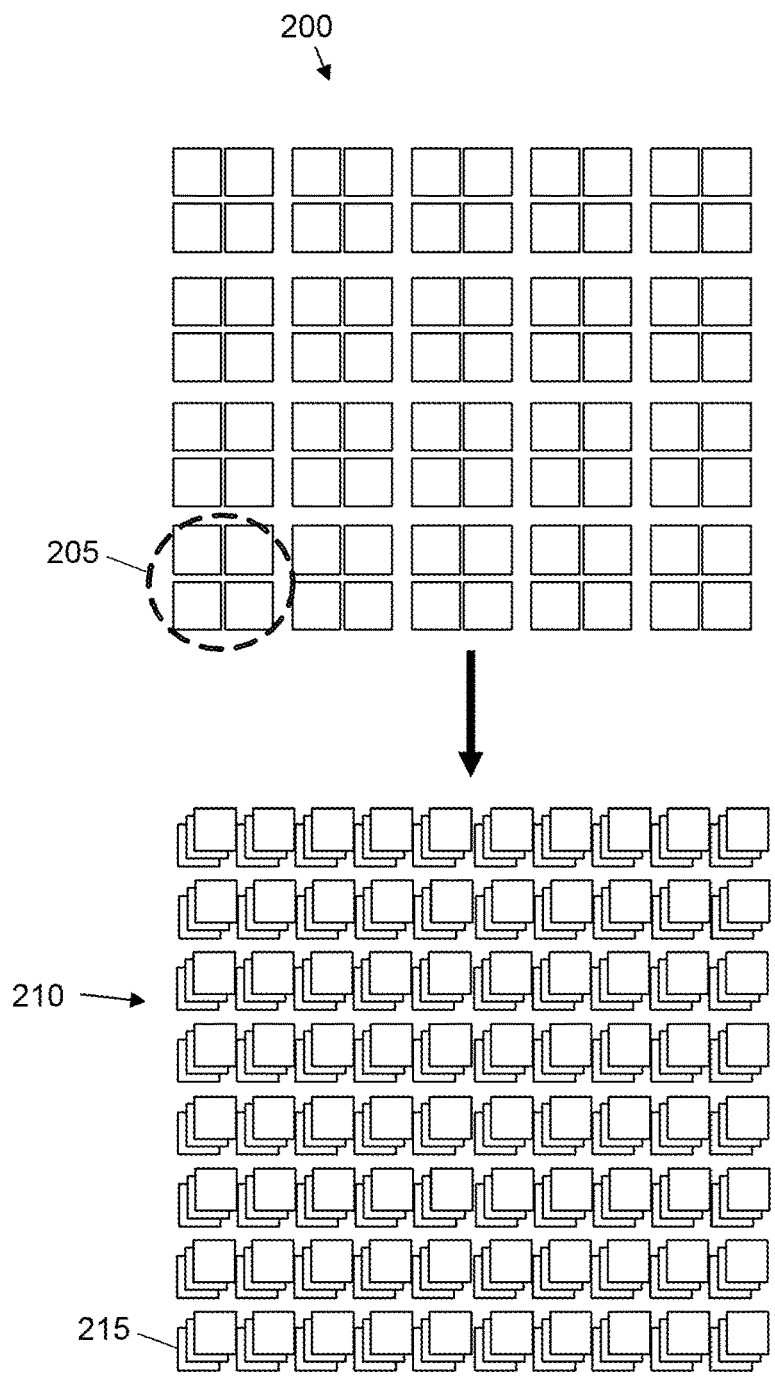
FIG. 2 shows a schematic representation of a demosaicing operation.

The image processing may alternatively or additionally comprise demosaicing of the image data. Demosaicing comprises converting a raw pixel data format to an output format, subject to potential further colour space conversion as described below. FIG. 2 shows a schematic representation of a demosaicing operation according to an example. Raw pixel data 200 comprises sets of four pixels 205, each of which comprises data corresponding to a single colour. For example, the image data may have been captured using a Bayer filter, wherein two diagonally-opposite pixels of such a set 205 comprise data corresponding to green, a third pixel comprises data corresponding to red and the fourth pixel comprises data corresponding to blue. Demosaicing comprises producing output image data 210 comprising pixels 215, wherein each pixel 215 comprises data corresponding to red, green and blue.

Raw pixel data corresponding to a given colour comprises no data corresponding to other colours. The demosaicing operation thus comprises determining this information from neighbouring pixels, for example by interpolation. For example, if the bottom-left pixel of the raw pixel data corresponds to green, the red and blue values of the bottom-left output pixel 215 must be determined from the surrounding pixels.

In addition to, or alternatively to interpolation, a demosaicing operation may comprise applying edge detection, for example by way of an edge detection filter, and/or texture detection. The consistency data may then describe the strength of response and/or direction of an edge detection algorithm in a given region of the processed image. The consistency data may, alternatively or additionally, indicate a reliability of the demosaicing for at least one region of the processed image. For example, high contrast noise may cause strong edge detection responses for more than one direction in a given region, leading to reduced reliability of the demosaicing in that region which may be indicated in the consistency data. Demosaicing may lead to false colour artefacts in reconstructed pixels, which may for example be compensated by desaturating the affected pixels. The consistency data may then identify pixels for which such desaturation, or other false colour reduction techniques, was applied. The computer vision decision may thus be based on the determined reliability.

The image processing may alternatively or additionally comprise conversion to a given colour space, for example luma-chroma colour space. In some examples, the conversion may be deliberately biased. For example, where the computer vision system relates to an autonomous vehicle, the luma plane may be biased towards red/green to improve road sign detection by the computer vision system. The consistency data may then indicate the presence of such a bias in a given region of the processed image. The conversion may, alternatively or additionally, comprise colour correction and/or white balancing operations. The consistency data may then describe the applied colour correction and/or white balancing.

The image processing may comprise soft clipping, whereby to improve human-perceived image quality while distorting pixel intensity. The consistency data may then describe the soft clipping applied to a given region, for example including a strength of the clipping and/or the unclipped pixel value.

The image processing may comprise chromatic aberration correction and/or warping, for example correction of distortion. These operations typically comprise translating and/or scaling of regions of the image. In some examples, colour components of the image data are separately and independently translated and/or scaled. For example, transform parameters may vary across the image such that a pixel of the image data at the edge of the image is moved more than a pixel of the image data at the centre of the image. In such examples, the consistency data may indicate details of the translation and/or scaling and/or may indicate that the degree of translation of a given image exceeds a predefined threshold. Alternatively or additionally, the consistency data may indicate that colour components were differently translated or scaled for a given region of the image, and/or that the degree of such a difference exceeds a predefined threshold.

The consistency data may further comprise other data relating to the processed image, for example identifying control software or drivers used to synchronise control of the image sensor and image processing operations, parameters relating to settings of the image sensor and image processing operations, and/or a checksum to enable cross-verification that settings applied to the sensor were consistent with parameters of the image processing operations. Such data may be image-wide data or may relate to specific regions of the processed image.

In some examples, some or all of the consistency data is generated and stored region-by-region and/or pixel-by-pixel at run-time as the above-described processing steps are performed. Alternatively or additionally, some or all of the consistency data may be assembled over time and stored for example once the processed image has been stored.

As described above, the consistency data is indicative of a consistency of at least one region of the processed image with the received image data. In some examples, the consistency is expressed as one or more values indicating the numerical difference between the value of a pixel, or multiple pixels in a region, in the processed image and the value of a corresponding pixel or region in the received image data. The consistency may, alternatively or additionally, be expressed as one or more confidence values, wherein a low confidence value indicates a low degree of consistency, i.e. a lack of consistency, and a high confidence value indicates a high degree of consistency. For example, a confidence value may be expressed as a floating point value between 0 and 1. This may be mapped onto an integer, for example an 8 or 16-bit integer. As another example, consistency data may comprise a flag indicating whether a confidence value is above a predefined threshold. Separate consistency data may be stored corresponding to one or more image processing steps as set out above. Alternatively or additionally, combined data such as a single confidence value may be stored corresponding to some or all of the image processing steps. For example, a mean or other average confidence value, or other metric of consistency, may be stored for all or some of the image processing steps.

Figure 3:
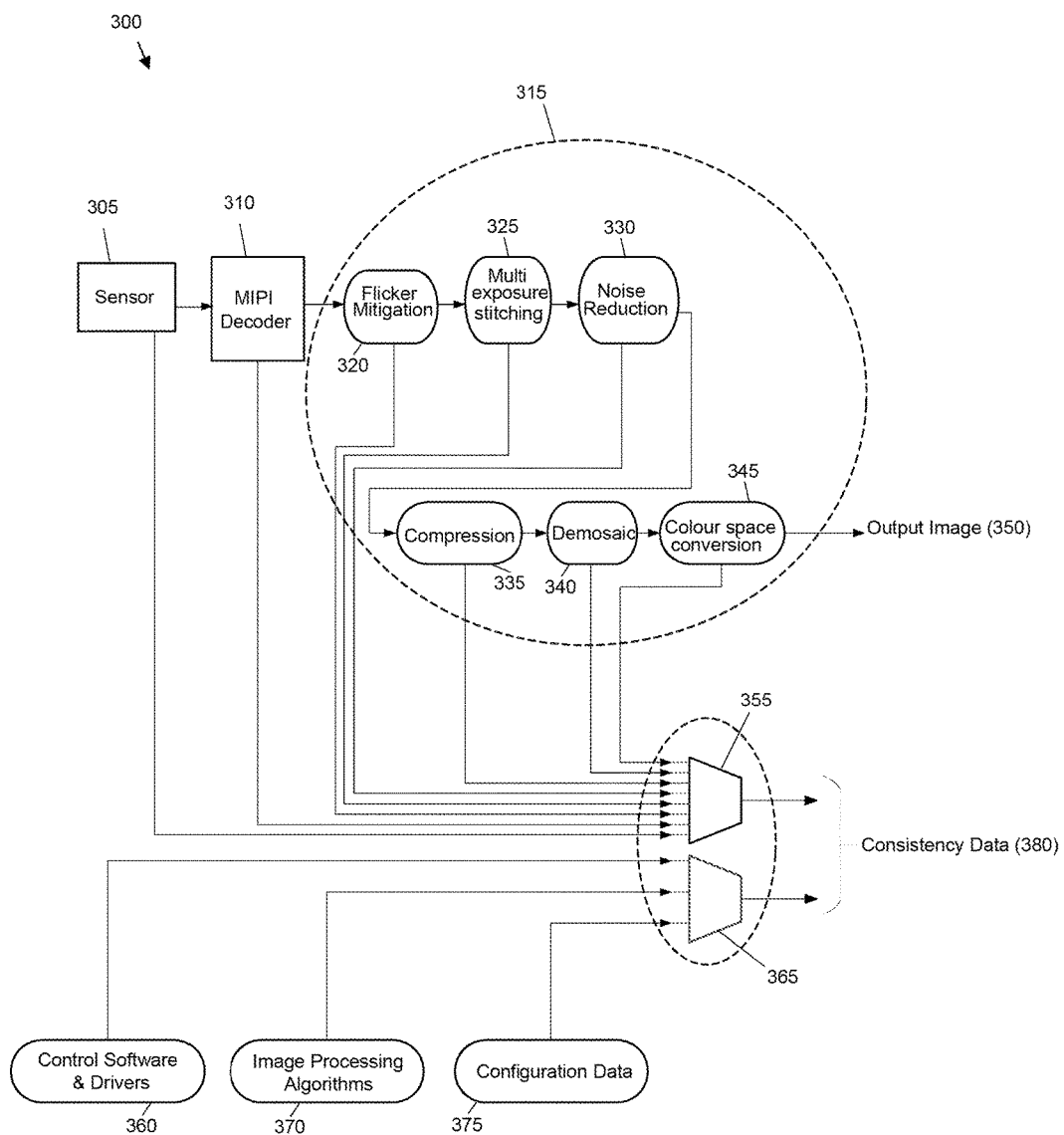
FIG. 3 shows a flow diagram of a method according to an example.

FIG. 3 shows a flow diagram of a method 325 according to an example. Image data is captured at a sensor 300. In addition to image data, further data may be captured such as processing gains applied to the captured image data, control parameters of the sensor, locations of known or detected defective pixels, and/or data describing detected flickering pixels or regions.

The image data is received by a decoder 310, preferably a standard decoder such as a Mobile Industry Processsor Interface (MIPI®) decoder and converted to a format suitable for processing, such as luma-chroma, YUV, image data.

Various image processing steps 315 are performed in an image signal processor (ISP), for example as described above. The image processing comprises flicker mitigation 320, multi-exposure stitching 325 to produce a high dynamic range output image, noise reduction 330, dynamic range compression 335, demosaicing 340 and colour space conversion 345. The output of each step leads to the input of the next step, forming an image processing pipeline. Finally, a processed image 350 is output, for example as a layer or layers.

As described above, consistency data 355 associated with each image processing step is generated and stored.

As described in more detail above, data 360 relating to control software and drivers used for controlling the image processing pipeline 315 and/or sensor 305 is stored as consistency data 365. Furthermore, data 370 relating to parameters of applied image processing algorithms such as transforms applied by the sensor 305 is stored as consistency data 365. Configuration data 375 describing for example a configuration of the sensor 305 is also stored as consistency data 365.

The consistency data 355, 365 is then output as combined consistency data 380.

Figure 4:
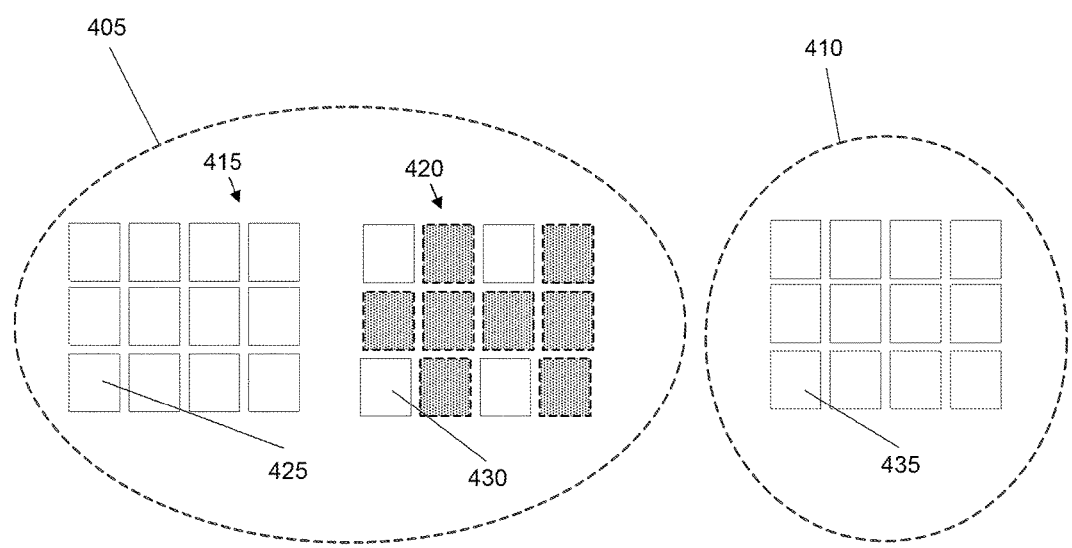
FIG. 4 shows a schematic representation of a processed image with associated consistency data.

FIG. 4 shows a schematic representation of a processed image 405 with associated consistency data 410. The processed image 405 comprises luma pixel values 415 and chroma pixel values 420, such that for example the bottom-left pixel of the processed image has a luma 425 and chroma 430. The luma values may be stored as 16-bit values, and the chroma values may be stored as pairs of 8-bit values, each corresponding to a separate chroma component and stored as a concatenated 16-bit value. In the present example, the chroma values are sub-sampled such that no data is stored for the shaded pixels. The consistency data 410 may be stored as a layer of the processed image 405 and/or as separate data or metadata. The consistency data may be compressed or otherwise encoded, for example by way of lossy or lossless compression algorithms The consistency data 410 comprises consistency data for each pixel. For example, the bottom-left pixel has consistency data 435. In one example the consistency data comprises a 16 bit binary value comprising:

- a 1-bit flag indicating if the input image pixel was identified as defective;
- a 1-bit flag indicating detection of an inconsistency during construction of the processed image 405 as a high dynamic range image, as set out above;
- a 2-bit value representing the index of the specific exposure selected to the represent the corresponding pixel of the processed image 405 (i.e. which of 4 possible exposures in a multi-exposure high dynamic range capture was selected);
- a 1-bit flag indicating that the pixel has been observed as one in which flicker was detected (and potentially corrected) as set out above;
- a 4-bit value representing a strength of noise reduction applied to the pixel;
- a pair of 3-bit indices representing the response strengths of a demosaic edge detection filter in both x and y directions; and
- a 1-bit flag indicating whether the pixel value was modified to supress false colours.

In some examples, at least one of the above-described regions of the processed image is a pixel of the processed image. Alternatively or additionally, at least one of the regions may comprise a group of pixels of the processed image, the group of pixels having predetermined dimensions. As such, the consistency data may comprise consistency data relating to single pixels and/or consistency data relating to regions of one or more predetermined sizes.

Figure 5:
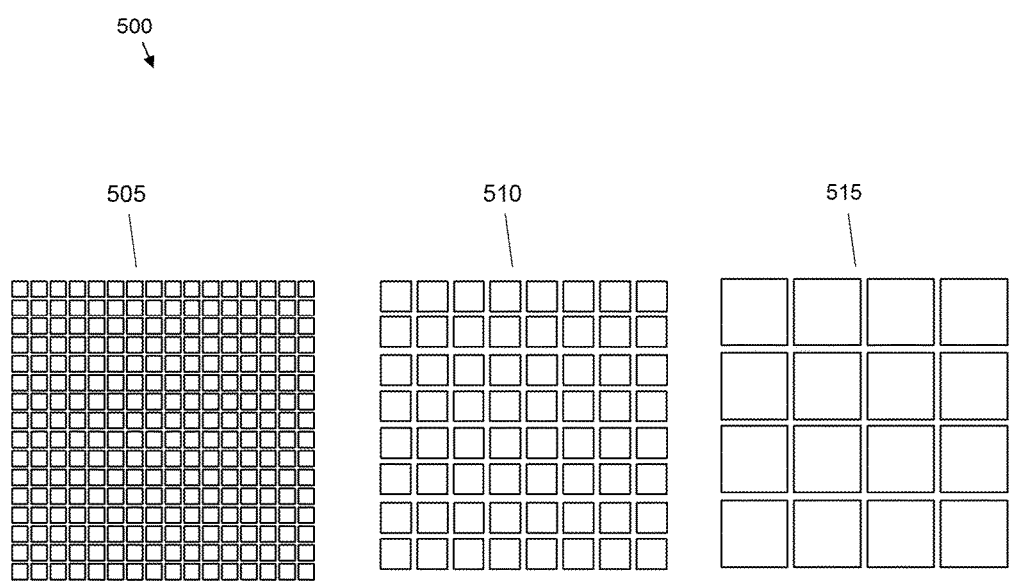
FIG. 5 shows a schematic representation of consistency data relating to regions of different sizes.

FIG. 5 shows a schematic representation of consistency data 500 relating to regions of different sizes. The consistency data comprises consistency data relating to single pixels 505, consistency data relating to 2×2 blocks of pixels 510, and consistency data relating to 4×4 blocks of pixels 515. As such, the consistency data relating to 2×2 and 4×4 blocks 510, 515 may be seen as sub-samplings of the consistency data relating to single pixels 505, such that each region represents a spatially larger region of the processed image. The sub-sampling may comprise an averaging of single consistency values, or may comprise a statistical analysis or non-linear function such as a minimum or maximum.

In other examples, the consistency data comprises consistency data relating to regions of other sizes with square, rectangular or irregular shapes. The predetermined dimensions may depend on a position of the region within the processed image. As an example, a region near the periphery of the processed image may be larger than a region near the centre of the processed image, for example where the image was captured using a wide-angle lens. Consistency data may not be stored for some regions of the processed image. For example, where the image data relates to a view from a vehicle, consistency data may not be stored for regions of the image that are occupied by parts of the vehicle.

The decision process of the computer vision system may comprise an object detection algorithm. An example of such an object detection algorithm and the training thereof may be found for example in UK patent application publication GB2529888. The decision process may comprise determining a reliability of object detection in a region of the processed image based on the consistency data. For example, an object detection algorithm based on a histogram of oriented gradients may be implemented based on the processed image. The reliability of this histogram may be assessed based on the consistency data. For example, the effects of any of the processing steps set out above, such as defect correction, on the histogram may be determined. This reliability may then be used by the computer vision system, for example to separate false detections, or lack of detections, in an object detection algorithm output from a linear classifier, or a cascade of linear classifiers. In one example, the computer vision system is associated with an autonomous vehicle and the object detection algorithm is an algorithm for detecting obstacles, such as pedestrians or other vehicles. Based on the detected obstacles and the above-described reliabilities, the autonomous vehicle may then use a computer vision decision process to manoeuvre to avoid the obstacles.

In another example, the consistency data may be used as an input to an object detection algorithm, such as a face detection and recognition algorithm. For example, the consistency data may indicate that strong colour correction has been applied to a region of the image. The colour correction may for example comprise any of local white balance correction, false colour reduction, purple fringe removal, soft clipping, chromatic aberration correction, alternative colour correction and/or colour space conversion. The consistency data indicating the presence of such colour correction may then be used to weight the decision of a face detection algorithm that relies on colour information. Similarly, an object detection algorithm such as a face detection and recognition algorithm may be weighted based on other consistency data as described in more detail above, for example indicating the presence of noise reduction, correction of defective pixels, and/or motion of an object between consecutive frames combined to form a high dynamic range image.

Figure 6A:
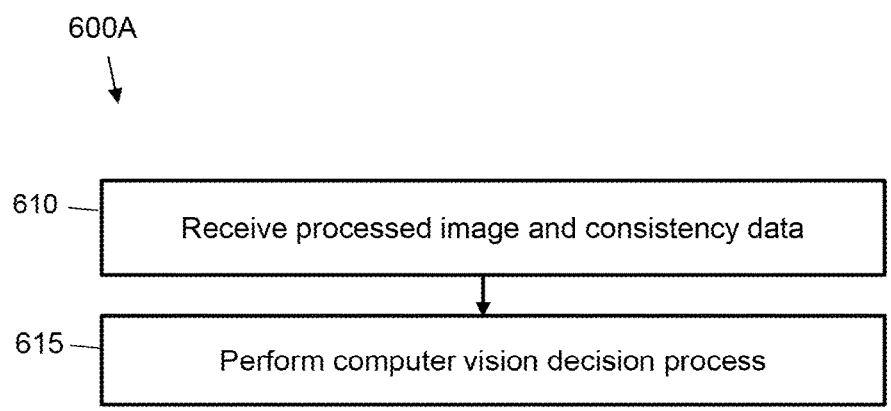
FIGS. 6A and 6B shows a schematic representation of a computer vision apparatus according to an example.

FIG. 6A shows a flow diagram of a method 600A performed by a computer vision apparatus according to an example. The apparatus comprises at least one processor. The at least one processor may for example comprise one or more general-purpose processors such as CPUs or GPUs, and/or one or more specific processors such as application-specific integrated circuits or field-programmable gate arrays. In some examples, a single processor performs all of the steps set out below. In other examples, some or all of the steps are performed by different processors.

The at least one processor is configured to perform a receiving step 610, comprising receiving a processed image and consistency data associated with image processing applied to image data whereby to produce the processed image, for example as described above. The consistency data indicates a consistency of at least one region of the processed image with the received image data.

The at least one processor is then configured to, based on the processed image and the consistency data, perform a computer vision decision process 615.

In some examples, the computer vision decision process comprises responding to an object, or lack thereof, detected in the processed image. For example, the computer vision apparatus may be associated with an autonomous vehicle, and the decision process may then be an obstacle avoidance process of the autonomous vehicle. Continuing the example wherein the computer vision apparatus is associated with an autonomous vehicle, the computer vision apparatus may identify no obstacles, such as pedestrians or other cars, in a region of the processed image. However, if the consistency data indicates that said region of the processed image is not strongly consistent with the image data from which it was produced, it may be determined that the conclusion of the lack of obstacles is not sufficiently reliable. For example, a value associated with the reliability may be below a threshold. The decision process may then direct the autonomous vehicle to avoid said region or to slow down. As another example, the decision process may comprise decreasing a weight of input data derived from the processed image and increasing a weight of input data derived from a source other than the processed image. For example, where the processed image is determined to be unreliable, the decision process may place a higher weight on input data from other sources such as radar or in-car telemetry.

Figure 6B:
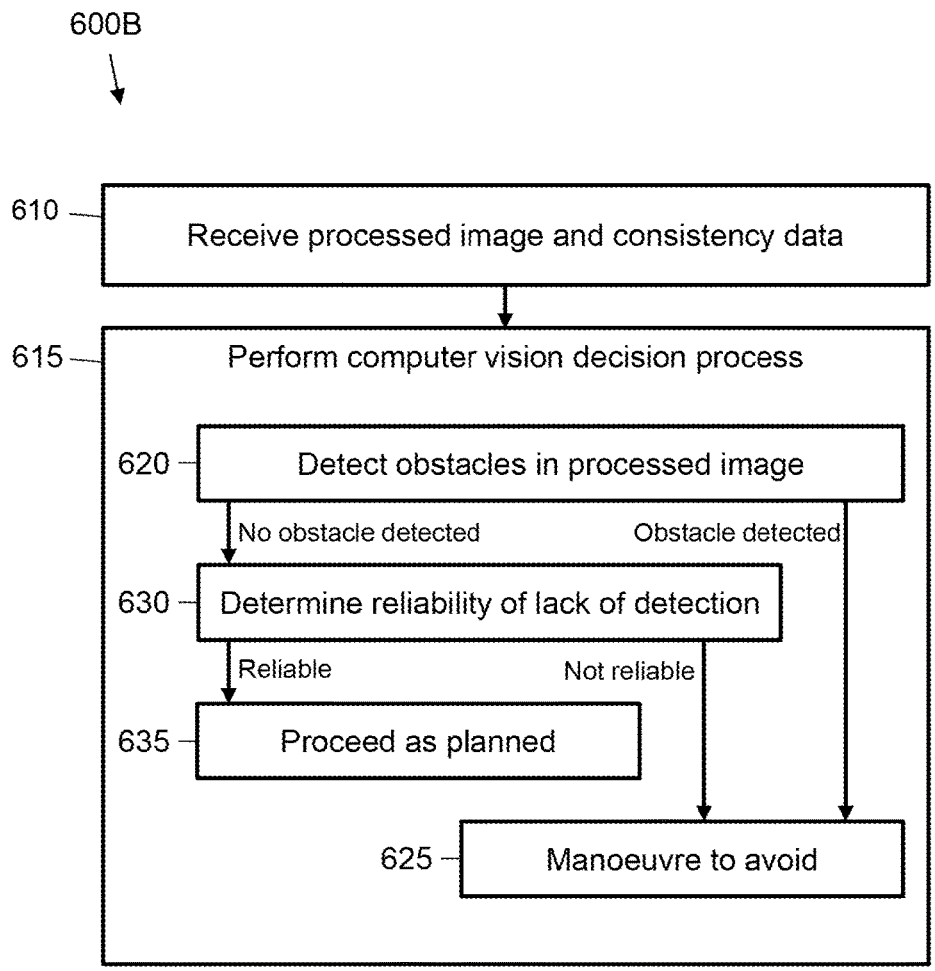

FIG. 6B is a flow diagram of a method 600B performed by a computer vision apparatus, according to an example wherein the computer vision apparatus is associated with an autonomous vehicle. The method comprises a receiving step 610 of receiving a processed image and consistency data and a step 615 of performing a computer vision decision process, as outlined above in relation to FIG. 6A. In the example of FIG. 6B, performing the computer vision decision process comprises a detecting step 620 of detecting obstacles in the processed image. The obstacles may for example be pedestrians and/or other vehicles.

If an obstacle is detected, the computer vision decision process 615 outputs data 625 indicating that the autonomous vehicle should manoeuvre to avoid the obstacle.

If no obstacle is detected, the decision process comprises a step 630 of determining a reliability of the lack of detection from the consistency data, for example as described in more detail above.

If the determined reliability indicates that the lack of detection is reliable, for example if a reliability value exceeds a threshold, data 635 is output indicating that the autonomous vehicle may proceed as planned. In some examples, no data may be output, and the control system of the autonomous vehicle may interpret the lack of such data as an indication that no evasive manoeuvring is required.

If the determined reliability indicates that the lack of detection is not reliable, for example if a reliability value is below a threshold, data 625 is output indicating that the vehicle should manoeuvre to avoid a potential undetected obstacle. In this manner, the autonomous vehicle may avoid potential obstacles that are not detected in the obstacle detection step 620.

In some examples, the computer vision apparatus 600 comprises an image sensor configured to capture the image data. The at least one processor 605 may be configured to receive the image data, for example from the image sensor, apply image processing to the image data, whereby to produce the processed image, and to generate the consistency data as set out above.

Figure 7:
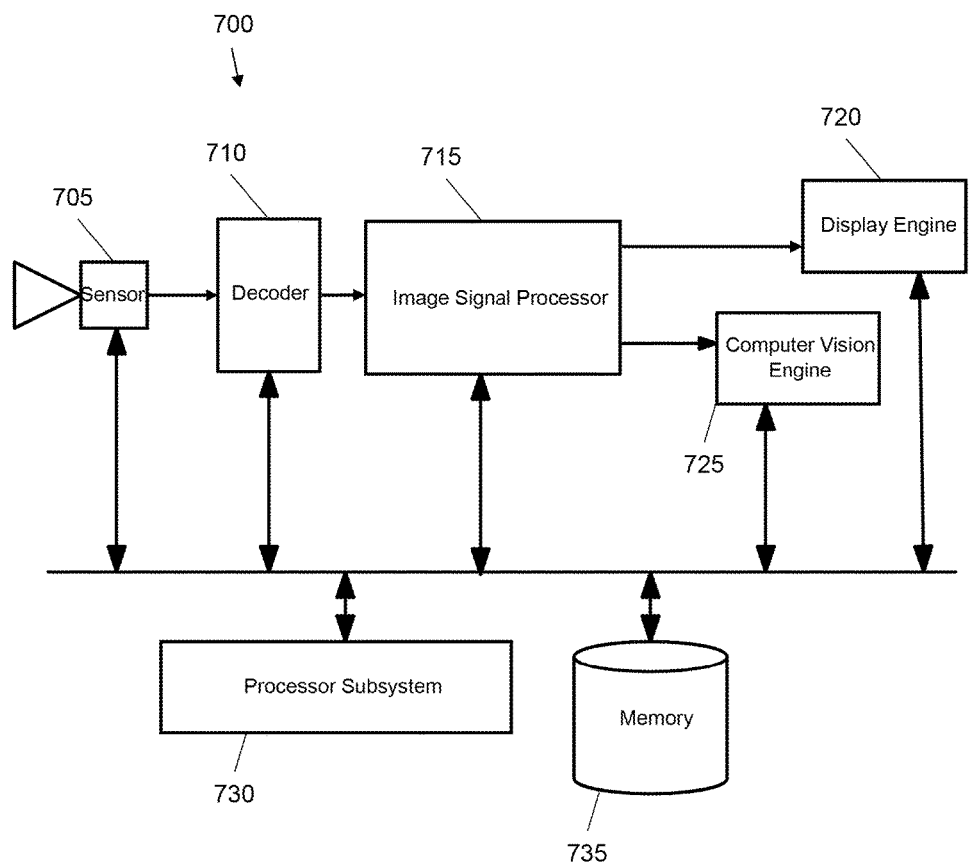
FIG. 7 shows a schematic representation of an apparatus according to an example.

FIG. 7 shows a schematic representation of an apparatus 700 according to an example. The apparatus 700 comprises a sensor 705, which may be an image sensor or other sensor module configured to capture image data. The sensor may for example form image data as an array of pixels, each pixel representing an intensity of light received at the sensor via a lens.

The apparatus 700 further comprises a decoder 710 such as a MIPI® decoder as described above. In addition to decoding the image data received from the sensor, the decoder 710 may perform additional processes such as scaling of the image data or fusion of data from multiple sources, for example from an array of sensors.

The decoder 710 transmits the decoded image data, for example as raw image data, to an image signal processor 715. The image signal processor 715 converts the decoded image data to a format for displaying by a display engine 720 and/or for analysis by a computer vision engine 725. The conversion may for example comprise performing image processing steps as set out in more detail above. For example, the image signal processor 715 may perform noise reduction, correction of defective pixels and/or combination of multiple received images to form a high dynamic range image.

The apparatus 700 further comprises a processor subsystem 730 and memory 735 to manage and control the operation of the apparatus.

Methods of the present disclosure may be implemented by way of a non-transitory computer-readable storage medium comprising a set of computer-readable instructions stored thereon which, when executed by at least one processor, cause the at least one processor to perform a method according to the present disclosure. The computer readable instructions may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read only memory (ROM), an erasable programmable read-only memory, or a portable disc.

The above embodiments are to be understood as illustrative examples. Further embodiments are envisaged. For example, the consistency data may further comprise parameters used in transforms or other processing of the image data before performing the image processing steps described above. Examples of such parameters include parameters relating to the operation of the image sensor such as analogue gain, exposure time, exposure ratios between subsequent images, and/or sensor integration time. The consistency data may further comprise parameters relating to processing of the image data after the processing steps described above, such as image scaling.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present application.

The invention claimed is:

1. A method of image processing, the method comprising:
receiving image data;

applying image processing to the image data to produce a processed image;

producing consistency data associated with the image processing, wherein the consistency data is indicative of a consistency of at least one region of the processed image with the received image data; and using both the processed image and the consistency data as inputs to a decision process of a computer vision system.

2. The method according to claim 1, comprising receiving the image data from an image sensor, the image data being captured by the image sensor.

3. The method according to claim 1, wherein the image data comprises a video frame.

4. The method according to claim 1, wherein:
the image processing comprises correction of at least one defective pixel in the image data; and
the consistency data identifies at least one corrected pixel in the processed image corresponding to the at least one defective pixel in the image data.

5. The method according to claim 1, wherein:
the processed image is a high dynamic range image:
the image processing comprises producing the high dynamic range image from a plurality of images at varying exposure settings; and
the consistency data identifies at least one region in the processed image corresponding to at least one region in which there is an inconsistency between the plurality of images.

6. The method according to claim 1, wherein:
the image processing comprises identifying and correcting for a flickering light source in the image data; and
the consistency data identifies at least one corrected region in the processed image corresponding to the flickering light source in the image data.

7. The method according to claim 1, comprising navigating an autonomous vehicle based on the decision process of the computer vision system.

8. The method according to claim 1, wherein a region of the at least one region is a single pixel of the processed image.

9. The method according to claim 1, wherein a region of the at least one region is a group of pixels of the processed image, the group of pixels having predetermined dimensions.

10. The method according to claim 9, wherein the predetermined dimensions depend on a position of the group of pixels within the processed image.

11. The method according to claim 1, comprising storing the consistency data as a layer of the processed image.

12. A non-transitory computer-readable storage medium comprising a set of computer-readable instructions stored thereon which, when executed by at least one processor, cause the at least one processor to:
receive image data;
apply image processing to the image data to produce a processed image;
produce consistency data associated with the image processing, wherein the consistency data is indicative of a consistency of at least one region of the processed image with the received image data; and
provide both the processed image and the consistency data as inputs to a decision process of a computer vision system.

13. A computer vision apparatus comprising at least one processor, the at least one processor being configured to:
receive a processed image and consistency data associated with image processing applied to image data whereby to produce the processed image, the consistency data indicating a consistency of at least one region of the processed image with the received image data; and
based on the processed image and the consistency data, perform a computer vision decision process.

14. The computer vision apparatus according to claim 13, further comprising an image sensor configured to capture the image data.

15. The computer vision apparatus according to claim 13, wherein the at least one processor is configured to:
receive the image data;
apply image processing to the image data, whereby to produce the processed image; and
generate the consistency data.

16. The computer vision apparatus according to claim 13, wherein:
the computer vision apparatus is associated with an autonomous vehicle; and
the decision process is an obstacle avoidance process of the autonomous vehicle.

17. The computer vision apparatus according to claim 16, wherein the decision process comprises decreasing a weight of input data derived from the processed image and increasing a weight of input data derived from a source other than the processed image.

* * * * *